United States Patent
White et al.

(10) Patent No.: US 6,912,231 B2
(45) Date of Patent: Jun. 28, 2005

(54) MULTI-BROADCAST BANDWIDTH CONTROL SYSTEM

(75) Inventors: James Douglas White, Melbourne, FL (US); John Walter Zscheile, Jr., Rockledge, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 888 days.

(21) Appl. No.: 09/915,943

(22) Filed: Jul. 26, 2001

(65) Prior Publication Data

US 2003/0021291 A1 Jan. 30, 2003

(51) Int. Cl.[7] .................................................. H04J 3/16
(52) U.S. Cl. .................. 370/466; 370/460; 370/395.52; 370/390
(58) Field of Search ........................... 370/460, 395.52, 370/466, 390

(56) References Cited

U.S. PATENT DOCUMENTS

| | | | |
|---|---|---|---|
| 5,987,022 A | 11/1999 | Geiger et al. | |
| 6,034,963 A | 3/2000 | Minami et al. | |
| 6,047,322 A | 4/2000 | Vaid et al. | |
| 6,076,114 A | 6/2000 | Wesley | |
| 6,119,235 A | 9/2000 | Vaid et al. | |
| 6,160,874 A * | 12/2000 | Dickerman et al. | 379/114.19 |
| 6,161,123 A | 12/2000 | Renouard et al. | |
| 6,320,875 B2 * | 11/2001 | Katseff et al. | 370/466 |
| 6,400,730 B1 * | 6/2002 | Latif et al. | 370/466 |
| 6,674,541 B1 * | 1/2004 | Kamiyama et al. | 358/1.15 |
| 6,684,087 B1 * | 1/2004 | Yu et al. | 455/566 |
| 2001/0045904 A1 * | 11/2001 | Silzer Jr. | 342/357.07 |

* cited by examiner

Primary Examiner—Kenneth Vanderpuye
Assistant Examiner—Son X. Nguyen
(74) Attorney, Agent, or Firm—Robert A. Schruhl

(57) ABSTRACT

A method and apparatus is provided for managing bandwidth and prioritizing different forms of data to be transmitted from a central hub or node to a plurality of ground stations. All data of all types including image data and text data is processed into frames of TCP formatted data at the central hub or node and passed through a bandwidth flow control system which imposes flow control on the data. Some of the TCP formatted data has inserted therein a conversion flag which denotes a desire to convert the TCP formatted data into UDP formatted data. A computer or controller/converter reads the conversion flags and converts TCP formatted data into UDP formatted data for multi-broadcasting simultaneously to a plurality of ground stations which reduces bandwidth.

20 Claims, 5 Drawing Sheets

MULTI-BROADCAST BANDWIDTH CONTROL SYSTEM

BACKGROUND OF THE INVENTION

1. Related Applications

This application is designed to make use of information supplied by ground stations as taught in our co-pending U.S. application Ser. No. 08/854,104 filed 11 May 2001 for a Dual Mode of Operation Multiple Access System for Data Link Communication which is incorporated by reference herein.

2. Field of the Invention

The present invention relates to communication networks of the type employed between airborne platforms and ground stations. More particularly, the present invention relates to a method and system for controlling the bandwidth of data transmitted by airborne transmitters to multiple ground station receivers.

3. Description of the Prior Art

Heretofore, point-to-point networks have been employed as intranets in businesses and as internets in the worldwide web. Point-to-point communications relate to a message or data sent to a particular receiver or user from a single source. When there are a number of receivers, the same message must be sent to each of the receivers which increases the bandwidth proportional to the number of receivers. U.S. Pat. Nos. 6,038,216 and 6,046,980, and references cited therein, have suggested a method and system for managing bandwidth in point-to-point networks by assigning priorities to the type of data and to the individual receivers or users. There are no known systems or apparatus for prioritizing messages and data in multi-broadcast or point-to-multipoint network systems.

It would be highly desirable to provide a method and a system for managing bandwidth in a point-to-multipoint central node airborne broadcasting system.

SUMMARY OF THE INVENTION

It is a primary object of the present invention to provide a system and method for managing bandwidth in User Datagram Protocol (UDP) systems.

It is a primary object of the present invention to provide a system and method for simultaneously managing bandwidth in both point-to-point and point-to-multipoint broadcast networking systems.

It is a principal object of the present invention to provide a system and method for simultaneously managing bandwidth in Transmission Control Protocol (TCP) and UDP systems.

It is a primary object of the present invention to provide a system and method for converting TCP data to UDP data.

It is a primary object of the present invention to provide a dedicated controller or personal computer (PC) for reading fields of a TCP header and determining whether or not it will be converted into a UDP format data and header.

It is a principal object of the present invention to provide a dedicated controller or PC for assimilating data from a plurality of TCP headers and converting the TCP data into UDP headers and data for multipoint broadcasting of data.

It is a primary object of the present invention to provide a method and system for broadcasting TCP headers and data and UDP headers and data randomly intersperced.

According to these and other objects of the present invention there is provided a communications network between an airborne platform and a plurality of ground stations (or a central node and a plurality of internet stations or nodes). A bandwidth flow control system is interposed between the stations and the central hub or platform which manages flow bandwidth of data in both TCP and UDP format simultaneously.

DETAILED DESCRIPTION OF THE PREFERRED EMBODIMENTS

Before referring to a detailed description, the applicants will use in this application the terms central node or central hub to mean any transmitting station that transmits to and receives from a plurality of stations various types of data. Thus, typical systems that would be employed in the present invention would be a system on the internet, a segment of the internet and/or a military airborne platform that disseminates surveillance data over wireless communication means to a plurality of ground stations.

Figure 1:
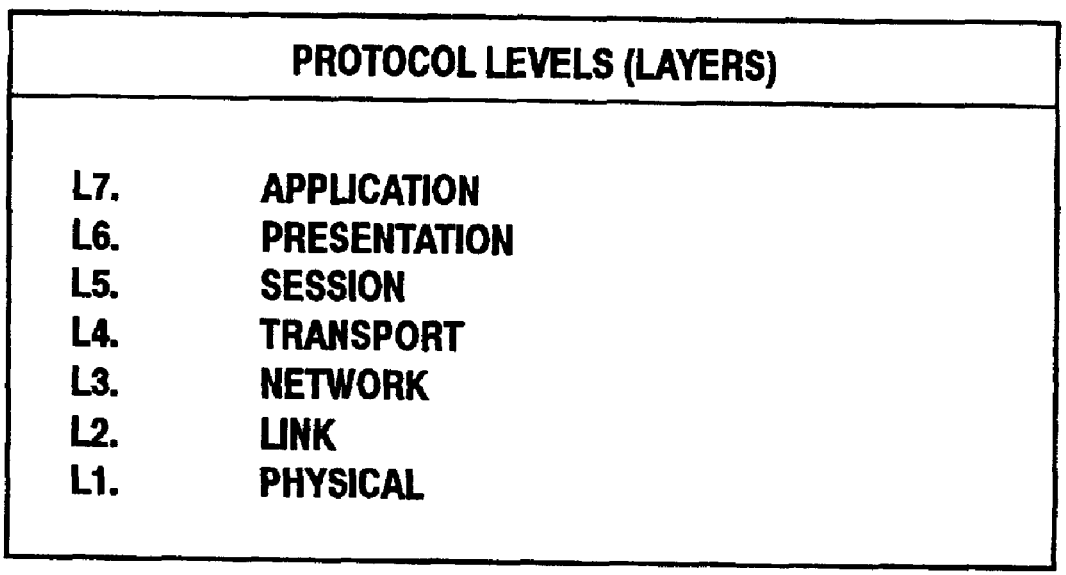
FIG. 1 is a table showing the seven protocol layers or levels of information used in Open Systems Interface (OSI) standard protocols.

Refer now to FIG. 1 showing a table 10 having seven layers of protocol information as used in an OSI standard protocol system. The purpose of the OSI layers and the different layers within the OSI protocol is to provide a set of services at each of the layers which allows the layers to communicate with each other and allows computers or other devices to communicate with each other. The known layers are numbered L1 to L7.

Figure 2:
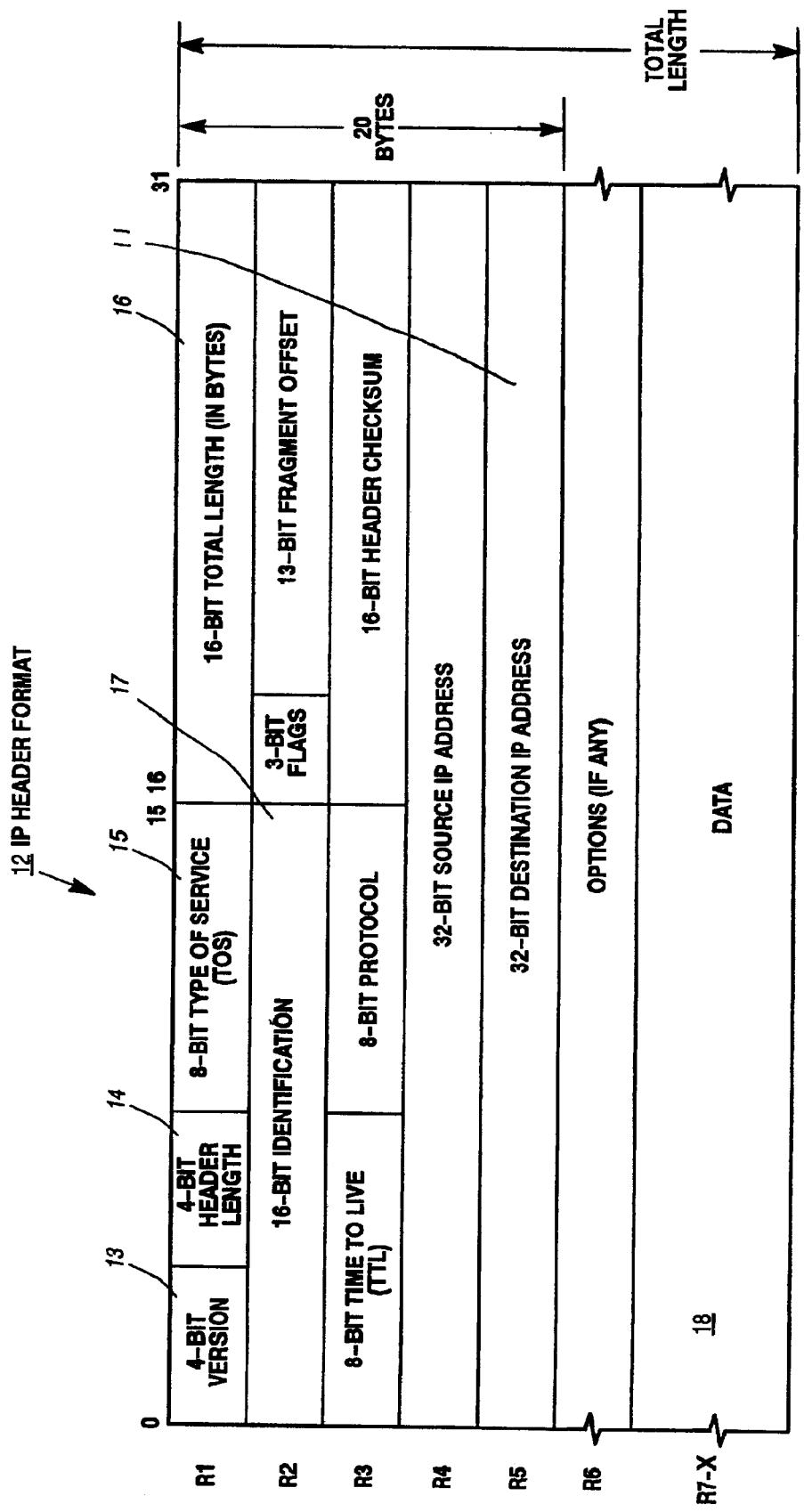
FIG. 2 is a schematic representation or arrangement of data in an Internet Protocol Header (IP Header) layer shown in FIG. 1.

Refer now to FIG. 2 showing a schematic representation of the arrangement of data in the L3 network layer (IP Header) layer shown in FIG. 1. The IP Header format 12 is shown comprising rows of 32 bits numbered 0 to 31. The first five of the rows comprises 20 bytes and form the IP Header as part of the total length of the IP Header format. The field 13 is used to identify the version of IP Header being used. The field 14 is used to identify the number of 32 bit rows in the IP Header format. The field 15 is used to identify the type of service which was formerly a quality of service (QoS) and is now used for various uses. The field 16 is employed to denote the total length of the complete IP Header format as shown in the right margin. Since the data field 18 may comprise a variable number of rows R7 to RX, the total length of the IP Header format is needed. The only other field of importance to this invention is the field 11 which is used to designate the destination IP address. The remaining fields which have not been specifically discussed are standards fields and are found in textbooks and do not require additional explanation herein.

Figure 3:
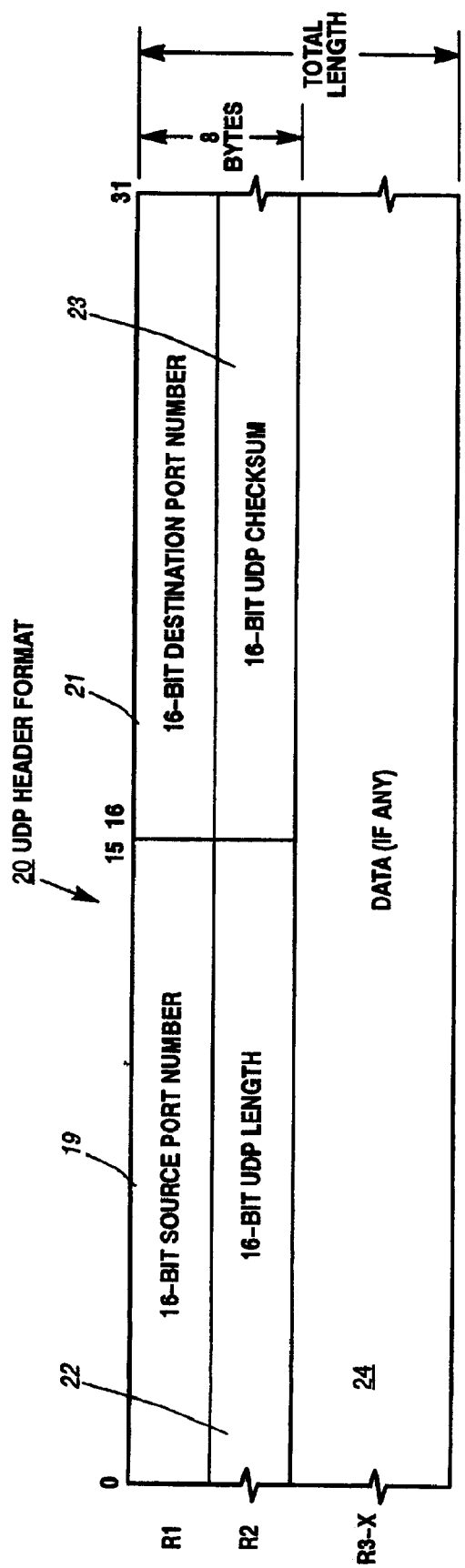
FIG. 3 is a schematic representation of a UDP Header which resides in the data field of the IP Header.

Refer now to FIG. 3 showing a schematic representation of a UPD Header format which comprises two rows of 32 bits each comprising eight bytes and a data field which may comprise a variable length of data as will now be explained. The UPD Header format 20 is shown comprising a source port number field 19 and a destination port number field 21. In order to identify the length of data there is a field 22 which defines the total number of bytes in the header and data field 24. A 16 bit check sum is provided in field 23.

Figure 4:
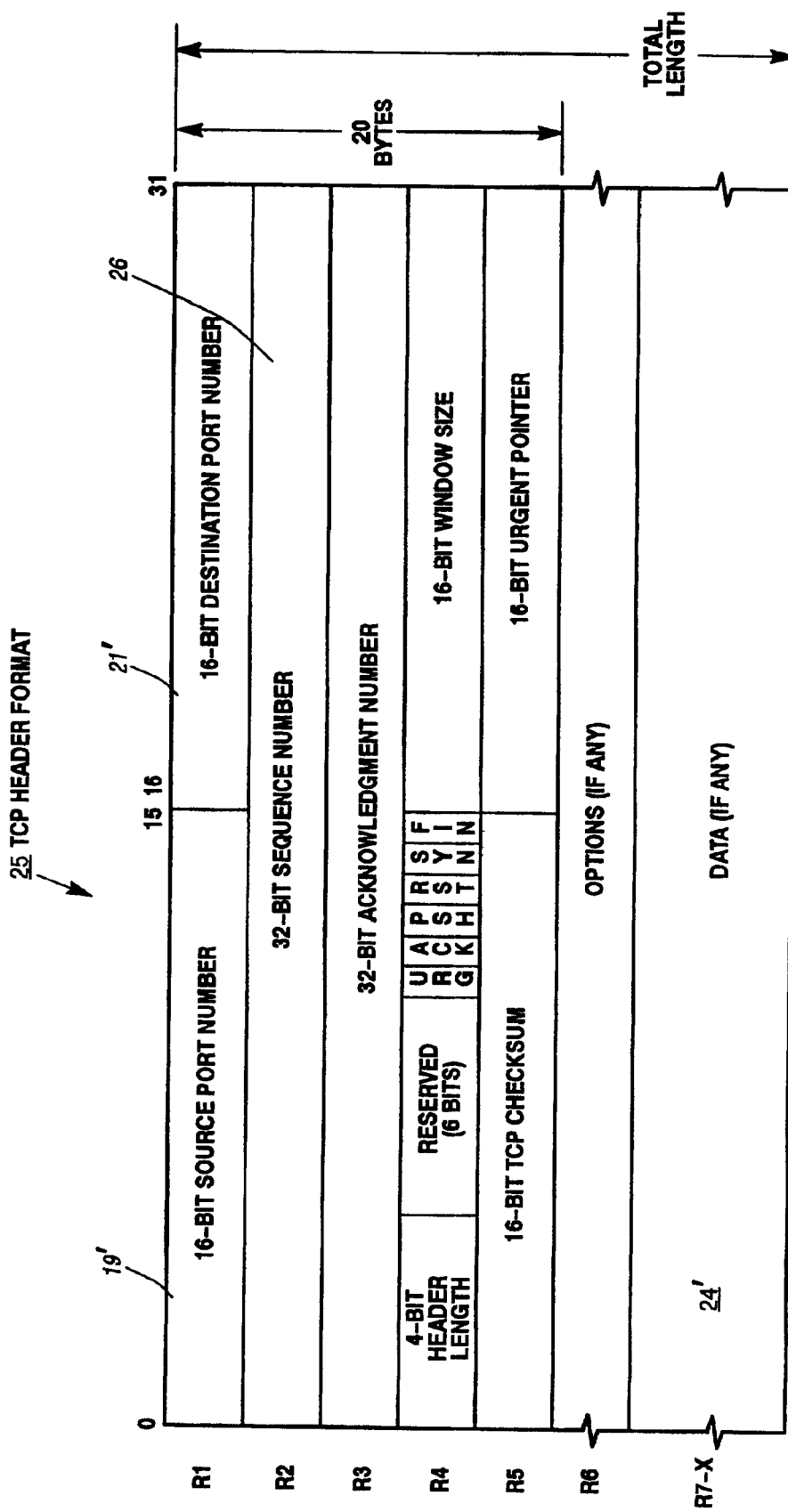
FIG. 4 is a schematic representation of a TCP Header which resides in the data field of the IP Header.

Refer now to FIG. 4 showing a schematic representation of a TCP Header format which resides in the data field 18 of the IP Header. The TCP Header format 25 is shown having a field 19' which identifies the sender port number similar to that described in FIG. 3. The field 21' defines the destination port number of the receiver and is similar to the field 21 in FIG. 3. The 32 bit sequence number 26 identifies the first sequence number for the data being sent in this particular TCP Header. The remaining fields of the TCP Header format shown in FIG. 4 are standard and are well known in this industry and do not require a detailed description.

Figure 5:
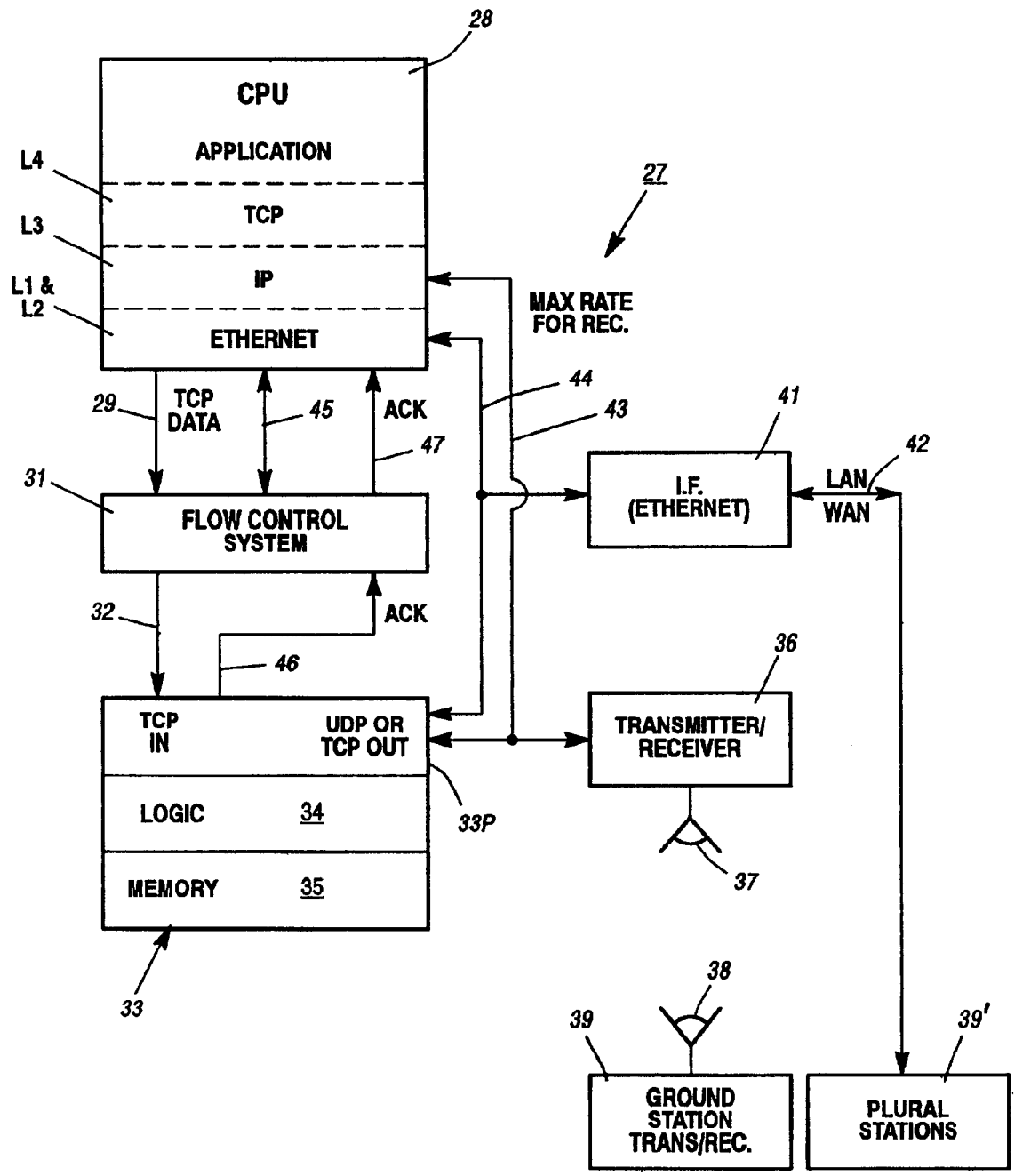
FIG. 5 is a block diagram of the preferred embodiment of the present invention showing a computer in a central hub or airborne station connected to both a conventional internet network and to an airborne communications network.

Refer now to FIG. 5 showing a block diagram of the preferred embodiment of the present invention system 27 comprising a central hub or airborne platform computer 28 connected to a conventional internet network and also connected in a broadcast configuration showing an airborne communications network. The central processing unit 28 is shown having protocol levels L1 and L2 at the ethernet level, having level L3 at the internet protocol level and having a transport control protocol level L4 at the transport level as described hereinbefore with reference to FIG. 1. The information formatted at the ethernet level is outputted as a TCP protocol data format package on line 29 and is inputted to a flow control system 31. In the preferred embodiment of the present invention, the flow control system has been implemented in Packeteer™ software similar to QoS software packages provided by such firms as Cisco, Starburst, Sitara and Checkpoint Systems. The TCP data on line 29 also appears at the output of the flow control system on line 32 and is input into the PC or controller 33 at the TCP input port. The PC or controller 33 is shown comprising a logic portion 34 and a memory portion 35. The memory and logic of the controller 33 determines by examining the flag data in the TCP format header whether or not the data should be converted to UDP format or should continue its journey in its TCP format at the output port 33P.

The UDP or TCP data and its header is coupled to a transmitter/receiver 36 which is provided with an antenna 37. The information is broadcast to a plurality of ground stations 39 each comprising a transmitter/receiver and an antenna 38. The ground stations 39 are capable of determining their maximum rate of data input or reception and may transmit this information from antenna 38 to antenna 37 which in turn is transmitted via line 43 to the CPU 28. The CPU 28 uses this information to reprogram the flow control system 31 via line 45.

In a similar manner, the system described hereinbefore also may operate on an internet or a LAN or a WAN. In this event, the output information from port 33P is supplied to the interface 41 which may be an internet interface and to line 42 which may be a local area network (LAN) line or wide area network (WAN) line 42. The information on the network 42 is supplied to the plurality of stations 39' or to individual stations as the case may be if it is a point-to-point network system. Similarly, the plural stations 39' may transmit on network 42 to the interface 41 their ability to receive information from the computer 28 and this information is supplied via line 44 as shown.

Having explained the preferred embodiment system FIG. 5 and an equivalent alternative system in the same drawing, it will be appreciated that both systems may not be operated together at the same time because one is airborne and the other one is basically a ground system. However, the computer or controller 33 which performs the conversion of TCP input data to UDP input data is the same and may be explained as follows with reference to FIGS. 3 and 4. In FIG. 4 there is shown a field number 21' for the destination port number. When a predetermined number appears in the field 21' of the TCP header the controller knows that the data in this header should be converted into a UDP header format. This predetermined number is also used by the controller 33 to modify the destination IP address 11 of IP header format 12 into a network destination IP address or a subnet destination IP address which may be read by all ground stations or a subset of the ground stations, respectively. The information shown in FIG. 4 is transferable directly from fields 19', and 21' directly into fields 19 and 21. The controller 23 has to calculate the other fields and insert them in the proper place in the UDP header format. It will be understood that the data field 24 in the UPD header is usually much larger than the data field 24' in the TCP header. To overcome this problem, the length of the field is sent over first and as subsequent TCP headers arrive they are assimilated and sent over to complete a UDP header. Stated differently, a plurality of TCP headers may be employed to generate one UPD header.

Having explained a preferred embodiment of using a portion of the field 21 to flag or designate a TCP header for conversion to a UDP header, it will be understood and appreciated that the same flag or a similar flag could have been inserted in the data field 24' and accomplish the same results. The fact that the field can vary from one of the fields 21 to one of the other unnumbered fields does not affect the result achieved by the controller 33.

A typical example of the utility of the present invention is a system which employs in an airborne platform the computer 28 which has assimilated from numerous other sources surveillance radar images, moving target indicator (MTI) images and all types of data which accompanies this information in textual form. As many as a thousand ground stations may be able to implement this information. However, it would be impossible to take particular information and send it by a point-to-point communication mode to each of the receiving stations and have sufficient bandwidth to disseminate the information in a reasonable length of time in which it could be utilized. In order to overcome this problem, the present invention not only prioritizes the information which is assimilated in point-to-point information format, but converts the information which may be disseminated in a point-to-multipoint format so that many or virtually all of the receiving stations may receive the most important information simultaneously and from time to time individual stations may receive point-to-point information which is not needed or should not be disseminated to all of the ground stations.

Another example which is yet to be implemented is a food chain or department store or retail store that has a large number of outlets and desires to change the prices on a number of individual items throughout all of the outlets. Thus, the outlets will be treated as the ground stations and the central hub is the central headquarters CPU which disseminates the information to the retail outlets. The present system will allow the headquarters store to simultaneously change the price in the computers of the ground stations or outlets by equating a new price to the bar code scanned without changing the marked designated price on counter or display unit.

Another example is a corporation or other entity that desires to send out meeting notices to all required attendees. The computer 28 can program the TCP data so that it is converted to UDP data and disseminated to the desired plural stations 39' simultaneously.

Since CPU 28 has updated information from its ground stations, it can dynamically change or prioritize the transmission of types of data to the individual stations in a point-to-multipoint mode.

Having explained a preferred embodiment in which the IP destination address 11 and TCP formatted data may be converted to network destination IP addresses and UDP formatted data, respectively, it will be understood that other formats and fields may be employed to accomplish the same desired result.

What is claimed is:

1. Apparatus for efficiently transmitting data in a plurality of different protocols in a managed bandwidth environment, comprising:

a central hub or node for communicating data to a plurality of stations in a TCP or UDP data format, means for formatting all data in a TCP format, means for prioritizing the TCP formatted data for transmission to one or more of said plurality of stations, means for designating TCP formatted data for conversion to UDP formatted data, means for converting said designated TCP formatted data into UDP formatted data, and means for transmitting TCP formatted data and UDP formatted data to said plurality of stations in a point-to-point broadcast mode or in a point-to-multipoint broadcast mode to efficiently utilize the bandwidth of said transmitter and to avoid duplication of transmission of the same data.

2. Apparatus as set forth in claim 1 wherein said means for converting TCP formatted data into UDP formatted data comprises computing means for reading and storing TCP formatted data and for creating UDP formatted data from the stored data.

3. Apparatus as set forth in claim 2 wherein said means for reading and storing said TCP formatted data comprises means for reading the total length of bytes to be included in said UDP formatted data.

4. Apparatus as set forth in claim 3 wherein said means for reading and storing said TCP formatted data comprises means for reading and storing a plurality of TCP formatted data frames, and said means for converting comprises converting a plurality of TCP formatted data frames into a single UDP data frame.

5. Apparatus as set forth in claim 4 wherein said means for converting comprises means for generating a UDP length of data and a checksum for the UDP formatted data.

6. Apparatus as set forth in claim 2 wherein said means for reading and storing TCP formatted data includes means for recognizing predetermined data employed to flag TCP formatted data to be converted to UDP formatted data.

7. Apparatus as set forth in claim 2 wherein said means for reading and storing TCP formatted data further includes means for replacing a destination IP address with a network destination IP address.

8. Apparatus as set forth in claim 7 wherein said destination IP address is read from the destination IP address field of an IP header and converted into a subset destination IP address of predetermined ground stations.

9. Apparatus as set forth in claim 8 wherein said hub or node for communicating data comprises means for receiving radar image data and text data to be formatted into a TCP format.

10. Apparatus as set forth in claim 9 wherein said radar image data comprises Synthetic Aperture Radar (SAR) images and Moving Target Indicator (MTI) images.

11. Apparatus as set forth in claim 1 wherein said plurality of ground station comprise means for receiving TCP and UDP formatted data.

12. A method for efficiently transmitting data in a plurality of different protocols in a managed bandwidth environment, comprising the steps of:

assimilating image data and text data at a central hub or node for efficient dissemination to a plurality of ground stations, formatting all data to be disseminated in a TCP format, passing said TCP formatted data through a bandwidth flow control system to determine priority of transmission to said ground stations, prioritizing the TCP formatted data to be passed through said bandwidth flow control system, designating in said TCP formatted data the TCP formatted data to be converted to UDP formatted data, converting the designated TCP formatted data to UDP formatted data, and transmitting TCP formatted data and UDP formatted data to said plurality of ground stations.

13. The method as set forth in claim 12 which further includes controlling the flow of said TCP formatted data and said UDP formatted data by controlling the flow of said TCP formatted data before conversion to UDP formatted data.

14. The method as set forth in claim 12 which further includes dynamically programming said flow control system.

15. The method as set forth in claim 12 which further includes transmitting data from said ground stations to said central hub or node to enable said central hub to dynamically program said flow control system.

16. A method of improving flow control of image data and text data in a point-to-multipoint data broadcasting system, comprising the steps of:

generating image data and text data at a central hub or node for efficient dissemination to a plurality of ground stations, processing said image data and said text data at said central hub into the frames of TCP formatted data, inserting conversion flags into some of said TCP formatted data, passing said TCP formatted data through a bandwidth flow control system, converting said TCP formatted data having conversion flags into UDP formatted data, and broadcasting multi-broadcast UDP formatted data to said ground stations subject to flow control prioritization.

17. The method as set forth in claim 16 wherein the step of inserting a conversion flag comprises placing a predetermined number in the header of said TCP formatted data.

18. The method as set forth in claim 17 which further includes placing a predetermined port number in a port destination field of said TCP header.

19. The method as set forth in claim 16 which further includes broadcasting TCP formatted data interspersed with UDP formatted data.

20. The method as set forth in claim 16 which further includes the steps of:

monitoring the maximum data rate of reception at said ground stations, transmitting said maximum data rate of reception to said central hub, and dynamically programming said flow control system.

* * * * *